Dec. 22, 1959 L. SILVERMAN 2,918,139
CENTRIFUGAL SEPARATOR
Filed May 20, 1957 2 Sheets-Sheet 2
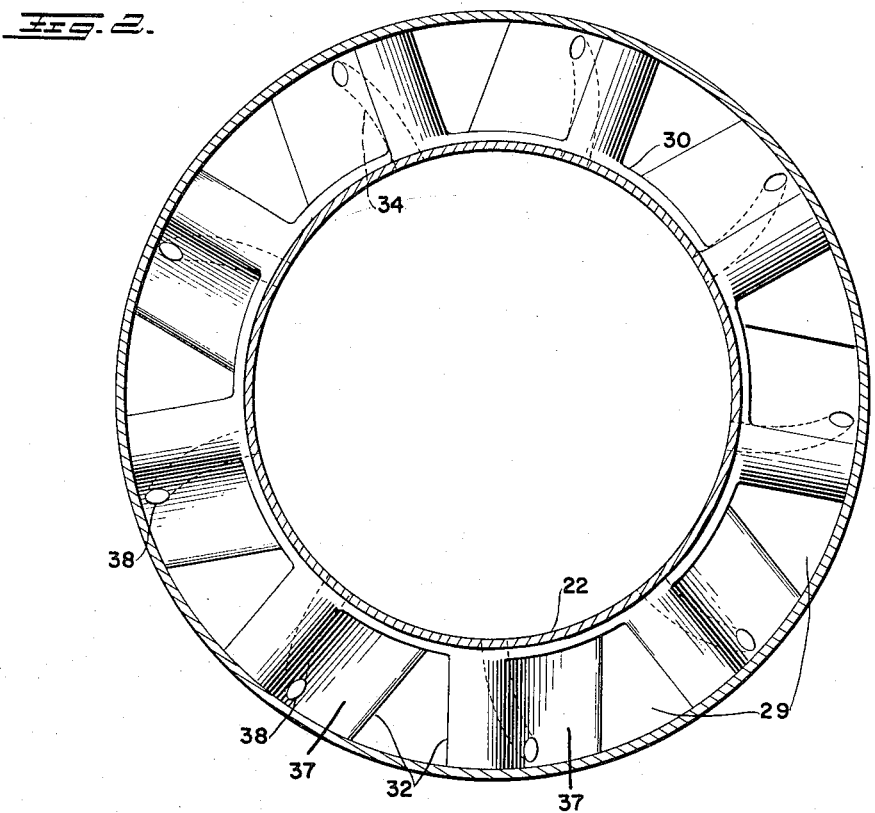
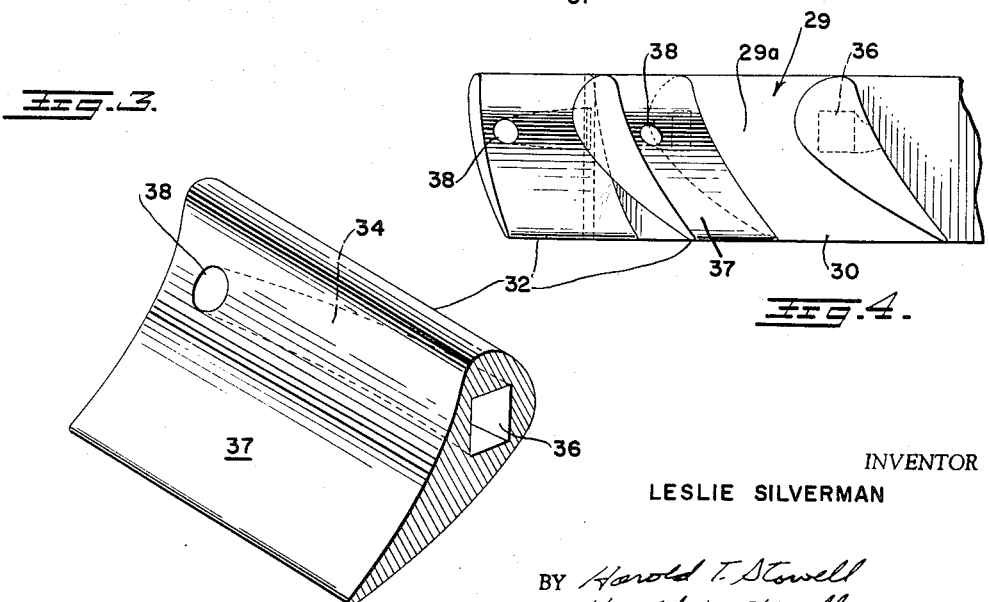
INVENTOR
LESLIE SILVERMAN
BY Harold T. Stowell
Harold L. Stowell
ATTORNEYS United States Patent Office 2,918,139
Patented Dec. 22, 1959

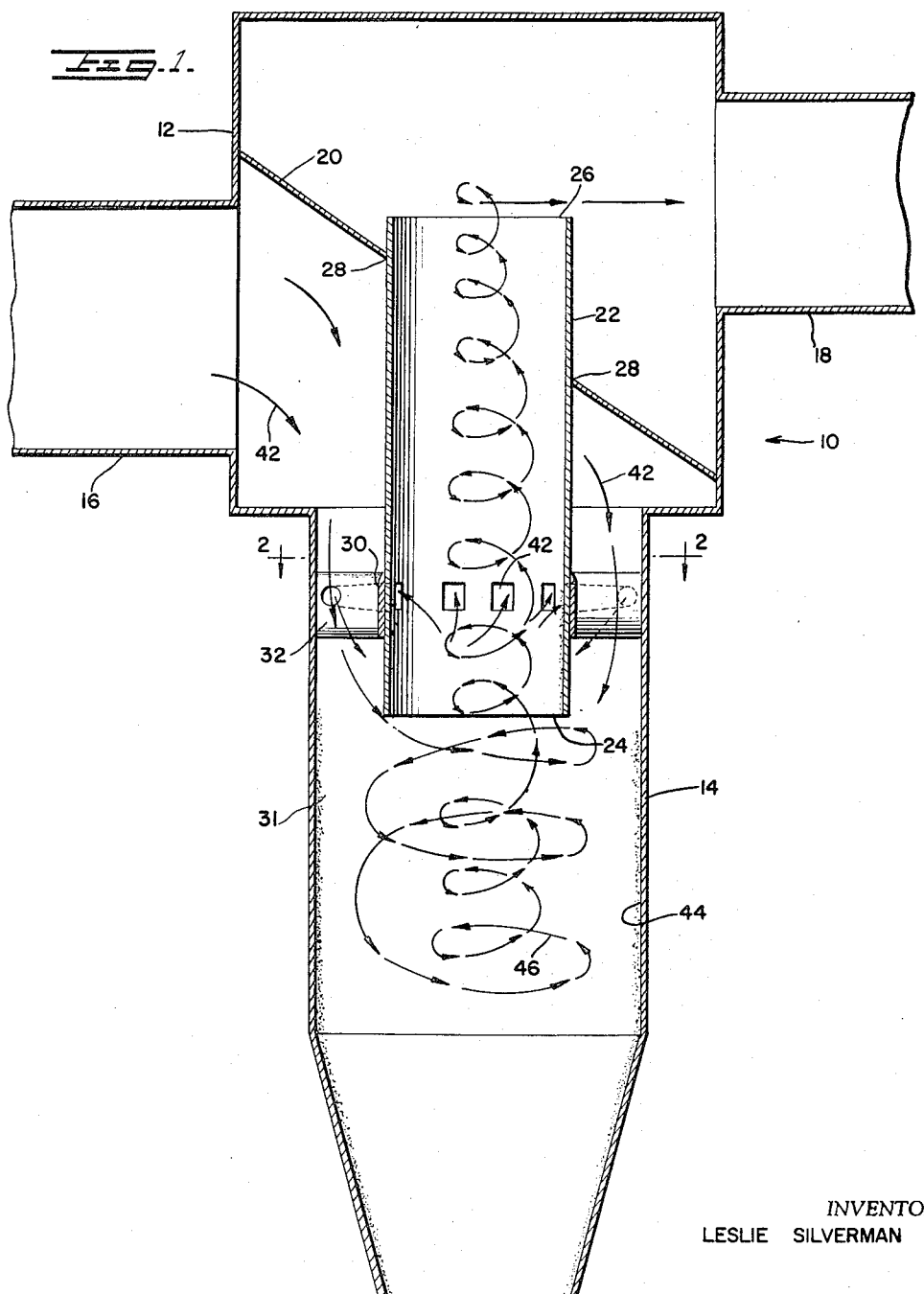

2,918,139
CENTRIFUGAL SEPARATOR

Leslie Silverman, Dover, Mass., assignor to Research-Cottrell, Inc., Bridgewater Township, N.J., a corporation of New Jersey Application May 20, 1957, Serial No. 660,307

4 Claims. (Cl. 183—81)

The present invention relates generally to the art of dust collectors and specifically to new and useful improvements in centrifugal dust collectors having vane members adapted to impart a swirling motion to a gas stream carrying suspended dust particles.

It is a general object of this invention to provide a new and useful dust collector which affords substantial improvements, both structural and functional, over prior devices utilized for the same general purpose.

Still another object of this invention resides in the provision of new and improved centrifugal dust collecting apparatus which provides in a single unit two-stages of separation thereby substantially increasing the efficiency of the apparatus.

A still further object of this invention is the provision of dust collecting apparatus of the type hereinabove described which includes recirculation means for a portion of the gas issuing from the discharge tube of the collector.

Still another and important object of this invention is the provision of dust collection apparatus as above described in which the structure of the apparatus provides for a recirculation of a selected portion of the gas discharging from the collector to the inlet side of the collector without necessitating the use of auxiliary piping and/or collectors.

Yet another object of this invention is the provision of dust collector apparatus in which a boundary layer of the centrifugally moving gas discharging from the collector is automatically aspirated directly into the gas inlet stream of the collector.

Still a further object of this invention is the provision of dust collection apparatus of the type described which is of relatively simple and inexpensive design and construction and which enables the production of collector apparatus at a cost closely consistent with the cost of conventional collector devices.

Still further and additional objects and advantages of this invention will become more readily apparent to those skilled in the art when the following description is considered in the light of the accompanying drawings.

The present invention generally comprises a cyclonic dust collector comprising a cylindrical collector tube, an outlet tube concentrically positioned in the upper portion of the collector tube and defining therewith an annular separating chamber, a plurality of vane members positioned in the inlet to the separating chamber between the inner wall of the collector tube and the outer wall of the outlet tube, an opening in the face of each of the vane members, each of said openings communicating with a passage through the vane member and the wall of the outlet tube, the curved surfaces of said vane members being shaped to provide converging-diverging gas passages into the collector tube whereby a portion of the gas stream adjacent the inner wall of the discharge tube is drawn into the separating chamber by the aspirating effect of said converging-diverging gas passages.

Referring now to the accompanying drawings in which like numerals designate similar parts in the several views:

Fig. 1 is a vertical sectional elevation of a dust collector embodying the present invention.

Fig. 2 is a horizontal sectional view taken on line 2—2, Fig. 1.

Fig. 3 is a perspective view of one of the spinning vanes constituting a part of the present invention.

Fig. 4 is a fragmentary elevational view of the vanes shown in Fig. 2.

In Fig. 1 of the drawings there is shown a cyclone or centrifugal dust collector 10 modified to include the improved structures constituting the present invention. The collector 10 includes a hood 12 having a vertically depending collector tube 14 therebeneath. The hood 12 is provided with an inlet 16 for dirty, dust-laden gases, and a remotely located outlet 18 for clean gases. An angularly disposed header plate 20 divides the hood into an inlet plenum chamber and an outlet plenum chamber.

An elongated gas exit or discharge tube 22 of lesser diameter than collector tube 14 is positioned concentrically within the upper open end of the collector tube. The lower open end 24 of gas exit tube 22 is located at a spaced distance below the upper end of collector tube 14, and the upper open end 26 of the exit tube 22 is located above the header plate 20 and discharges into the outlet plenum chamber. As is seen in Fig. 1 of the drawing, an intermediate portion of the gas exit tube is secured, as at 28, to the header plate 20 through which the tube projects.

A spinner-vane support ring 30 is secured concentrically about the gas exit tube 22 at a point thereon below the upper open end of the collector tube 14. The support ring 30 carries integrally therewith, Fig. 2, a plurality of radially extending, circumferentially spaced, aerodynamically-shaped arcuate gas spinning vanes 32. Each of the spinning-vanes 32 is of an airfoil design including a curvilinear configuration of tapering thickness in a vertical direction. Such vane construction serves to impart a centrifugal motion to gases entering downwardly into the collector from the gas inlet plenum chamber.

The vane members 32, as more clearly shown in Figs. 3 and 4, also cooperate to form gas passages 29 into the separation chamber or zone 31 of converging-diverging configuration. Each of the converging-diverging passages 29 defines a Venturi type section and produces a zone of law pressure adjacent the throat area 29a of the gas passage.

As is best illustrated in Figs. 3 and 4 of the accompanying drawing, each of the spinning-vane members is also provided with an internally formed passage 34 which extends from a substantially rectangular opening 36 in an end wall of the vane transversely of the vane to open outwardly through the face 37 of the blade into the low pressure zone of the Venturi type section, through a circular opening 38 of a reduced area relative to that of opening 36. As is shown, the passage 34 is of reduced, tapering cross sectional area in the direction of the end opening 38. The tapered passage 34 cooperates with the Venturi type constriction formed in the gas passages 29 to produce aspiration through the inlet 36 as to be more fully described hereinafter.

The outlet openings 38 may be circular in cross section as shown in the drawings. However, the shape of the outlets is not critical and, for example, oblong slots would be satisfactory. The outlet openings, however, are preferably located adjacent the inner wall of the separator tube to introduce the aspirated material at a point where the most effective separation will take place.

Completing the present improved construction, the gas exit tube 22 is provided about its circumference, immediately within the area of the vane supporting ring 30, with a plurality of spaced, rectangular openings 40, each of which registers with the enlarged end opening 36 of one of the spinning vane passages 34 through an intermediate and complementary opening (not shown in full line) in the support ring 30.

Operation

The operation of the present dust collector construction provides for the attainment of new and improved efficiencies in the separation of dust from a flowing gas stream by recirculating through the separator chamber 31 a selected portion of the gas discharge of the collector.

Dust-laden gases entering the collector, arrows 42, will be induced to a spiral, centrifugal flow by the vanes 32 causing dust particles 44 entrained in the gas to be thrown outwardly from the swirling gas stream against the tube walls where they are free to fall by gravity to a lower discharge point.

The gases depleted of larger suspended dust particles will then reverse direction of linear movement in the collector tube (see arrows 46) and exit through discharge tube 22. The gases will thus turn and flow upwardly and outwardly of the exit tube flowing in a centrifugal vortex rotating in the same direction as they rotated in their downward path in the collector tube. By maintaining the same direction of rotation in its upward path in the direction of the outlet, any dust particles carried over from the collector tube will be maintained primarily in the outer boundary layer of the rotating gas stream adjacent the inner wall of the exit tube. Thus, as the gas passes upwardly through the exit tube the dust particles will be concentrated in the outer boundary layer and will pass in close adjacency to the openings 40 circumferentially spaced about the exit tube wall.

The lower velocity of the gas in the discharge tube as compared with the downwardly flowing gases which have received a velocity boost by reason of the airfoil construction of the spinning-vanes 32, results in a pressure differential between the gas flowing in the throat 29a of the converging-diverging Venturi type passage 29 in the spinner vane assembly.

The pressure and velocity gradients between the gases passing through the throat 29a and those flowing upwardly in the exit tube will cause an aspiration of the boundary layer of gases in the exit tube through the passages 30 internally of the vanes to cause re-entry of a portion of the gases in the exit tube into the inlet gas stream of the collector tube 14. As has been pointed out, the highest concentration of dust particles carried over from the collector tube into the exit tube are immediately adjacent the exit tube walls and it will be this portion of the exiting gases which will be recirculated for further cleaning within the collector tube 14.

From the foregoing it is apparent that a unique and highly useful improvement is provided for a cyclone or centrifugal dust collector which serves to recirculate a portion of the discharging gases through the initial collector stage and in which that portion of recirculated gas is drawn from an area in the exhaust gas stage where the highest concentration of carry-over dust exists.

Accordingly, the present invention provides a dust collector which is capable of operation at greatly increased efficiencies over prior constructions through the provision for recirculation of a portion of discharging gases thereby eliminating the necessity of accessory collectors, piping and auxiliary cyclones which have been conventionally utilized heretofore in an effort to attain and accomplish the same useful results obtainable through the use of this invention.

It is, of course, fully contemplated that modifications may be made in the illustrative embodiment shown with regard to specific configurations and details of individual component construction to obtain variations in operational results. For example, the particular shape of the back surface of the vanes 32 in cooperation with the airfoil shape of the front surface may be variously modified from that shown in the drawing and the cooperating shape of these surfaces will determine to a large extent the aspirating effect of the recirculation means of the present invention.

I claim:

1. In a centrifugal dust collector including a collector tube having a gas inlet, a gas exit tube extending outwardly concentrically of said gas inlet, and gas spinning vanes in said inlet radially about said exit tube, means forming a zone of low pressure between each of said spinning vanes, and a passage providing communication between the zones of low pressure and the interior of said gas exit tube said passage being formed within the gas spinning vanes and extending from an opening in the faces thereof to the interior of the exit tube.

2. A dust collector comprising a cylindrical collector tube, an outlet tube concentrically positioned in the upper portion of the collector tube and defining therewith an annular separating chamber, a plurality of vane members positioned in the inlet to the separating chamber between the inner wall of the collector tube and the outer wall of the outlet tube, an opening in the face of each of the vane members, each of said opening communicating with a passage through the vane member and the wall of the outlet tube, the curved surfaces of said vane members being shaped to provide converging-diverging gas passages into the collector tube whereby a portion of the gas stream adjacent the inner wall of the discharge tube is drawn into the separating chamber by the aspirating effect of said converging-diverging gas passages.

3. In a centrifugal dust collector including a collector tube having a gas inlet, a gas exit tube extending outwardly concentrically of said gas inlet and gas spinning vanes in said inlet spaced radially about said gas exit tube, an aspiration passage formed within at least one of said gas spinning vanes and providing communication between a face of said one of the gas spinning vanes and the interior of the gas exit tube of the collector, said aspiration passage being formed within said one of the gas spinning vanes and diverging from an opening in said face thereof over which gas to be cleaned flows to a larger opening communicating with the interior of the gas exit tube.

4. A centrifugal dust collector as defined in claim 3 including a Venturi type constriction formed in the gas flow passage between opposed faces of adjacent gas spinning vanes and wherein said opening in the face of said one of said gas spinning vanes communicates with said Venturi type constriction.

References Cited in the file of this patent

UNITED STATES PATENTS

| 2,229,860 | McCurdy | Jan. 28, 1941 |
| 2,698,672 | Burnside et al. | Jan. 4, 1955 |

FOREIGN PATENTS

| 554,445 | Great Britain | July 5, 1943 |
| 1,020,317 | France | Apr. 22, 1950 |